United States Patent [19]

Dausmann et al.

[11] Patent Number: 4,989,929
[45] Date of Patent: Feb. 5, 1991

[54] PROCESS OF MAKING AN ACHROMATIC HOLOGRAM WHICH IS ADAPTED TO BE RECONSTRUCTED WITH WHITE LIGHT

[75] Inventors: Gunther J. Dausmann, Erding; Rudi T. de Jongh, Rosenheim; Klaus A. Gnadig, Munich, all of Fed. Rep. of Germany

[73] Assignee: Holtronic, GmbH, Erding, Fed. Rep. of Germany

[21] Appl. No.: 275,394

[22] Filed: Nov. 23, 1988

Related U.S. Application Data

[63] Continuation-in-part of Ser. No. 786,236, Oct. 10, 1985, abandoned.

[30] Foreign Application Priority Data

Oct. 11, 1984 [DE] Fed. Rep. of Germany ....... 3437355

[51] Int. Cl.$^5$ .......................... G03H 1/20; G03H 1/22
[52] U.S. Cl. .................................. 350/3.83; 350/3.69; 350/3.85; 350/320
[58] Field of Search ..................... 350/3.83, 3.76, 3.86, 350/3.6, 3.85, 320

[56] References Cited

U.S. PATENT DOCUMENTS

4,445,749 5/1984 Benton .............................. 350/320
4,478,481 10/1984 Fusek et al. ...................... 350/3.83
4,498,729 2/1985 Benton .............................. 350/3.85

OTHER PUBLICATIONS

Caulfield, H. J. "The Wonder of Holography" *National Geographic*, vol. 165, No. 3, pp 364–377, Mar. 1984.

Primary Examiner—Bruce Y. Arnold
Assistant Examiner—James Pham
Attorney, Agent, or Firm—Morgan & Finnegan

[57] ABSTRACT

A process is disclosed for making an achromatic hologram which is adapted to be reconstructed with white light and which is recorded on a photographic record carrier by means of an object beam and a reference beam of coherent monochromatic light in an operation in which the object beam and a reference beam of coherent monochromatic light in an operation in which the object beam passes through an image-forming optical element between the object and the recording material. The image forming element has a large relative aperture. When the first hologram has been recorded on the record carrier a reference beam is projected in a direction which is opposite to the direction of the reference beam used to record the first hologram and is thus used to reconstruct the object wave from the first hologram. The object wave from the first hologram is rearwardly projected through the optical element and used to form an image at the original position of the object and at that location is caused to interfere with a reference beam, whereby an undistorted image of the object is recorded as a second hologram on a second record carrier.

8 Claims, 6 Drawing Sheets

PROCESS OF MAKING AN ACHROMATIC HOLOGRAM WHICH IS ADAPTED TO BE RECONSTRUCTED WITH WHITE LIGHT

RELATED APPLICATIONS

This application is a continuation-in-part of our co-pending application Ser. No. 786,236, filed Oct. 10, 1985, now abandoned and which is entitled PROCESS FOR MAKING BLACK AND WHITE HOLOGRAM WHICH IS ADAPTED TO BE RECONSTRUCTED WITH WHITE LIGHT.

BACKGROUND OF THE INVENTION

This invention relates to a process for making an achromatic hologram which is adapted to be reconstructed with white light and which is recorded on a photographic record carrier by means of an object beam and a reference beam of coherent monochromatic light in an operation in which the object beam passes through an image-forming optical element between the object and the recording material.

Such a process is known, e.g., from U.S. Pat. Nos. 3,633,989 and 3,944,322.

In the process known from U.S. Pat. No. 3,633,989, a hologram is made which has only a horizontal axis so that it represents a stereoscopic image which is reproducible in a horizontal direction. As a result, the image has a relatively low information density because the information along the vertical axis is filtered out. Such image is suitable, e.g., for electronic transmission. This known prior process will be explained hereinafter in more detail with reference to FIGS. 1 to 3.

On the other hand, U.S. Pat. No. 3,944,322 discloses measures for improving the reproduction of such a hologram which can also be autostereoscopically reconstructed in achromatic form in one direction only.

Still further, the so-called open aperture process is known from the publication "Holography Handbook", Ross Books, P. O. Box 4340, Berkeley, CA 94704. This process will be explained hereinafter with reference to FIGS. 4 to 6.

In view of the known processes mentioned above, it is an object of the present invention to provide a process for making an achromatic hologram of improved quality with the aid of simpler means and which resulting hologram is adaptable to being autostereoscopically reproduced in all axial directions as well as adaptable to being mechanically duplicated by means of embossing.

SUMMARY OF THE INVENTION

This object is accomplished in accordance with the invention by providing an image-forming element which has a relatively large aperture and onto which element, when the first hologram has been recorded on a record carrier, a reference beam is projected in a direction opposite to the direction of the reference beam used to record the first hologram and which is, thus, used to reconstruct the object wave from the first hologram, the object wave being rearwardly projected through the optical element and used to form an image at the original position of the object and which reference beam at that location is caused to interfere with another reference beam, whereby an undistorted image of the object is recorded as second hologram on a second record carrier.

The first hologram formed in the process in accordance with the invention is a so-called master hologram and may be much smaller than the hologram used in the open aperture process. As a result, the instant process permits the use of a smaller collimated beam as a reference beam so that optical systems may be used in carrying out the process of this invention which are less expensive but may produce a higher quality product than those used in the known processes. Because of their smaller dimensions, the collimating optical systems used in accordance with this invention may be manufactured to possess higher quality reproduction attributes so that they will necessarily result in smaller aberrations.

In connection with the image-forming optical element which consists of a positive lens, the terms "large relative aperture" or "relatively large aperture" describe the ratio between the large aperture and a short focal distance.

The use of optical elements having a relatively large aperture results in considerable aberrations, such as spherifical aberrations, astigmatisms, etc. In order to eliminate such aberrations in accordance with the invention, the optical element used to record the first hologram is subsequently used to record the second hologram also so that all aberrations are compensated for because in the recording of the second hologram the optical element having a relatively large aperture transmits light in a direction opposite to the direction in which it transmitted light for the recording of the first hologram. Consequently, the aberrations appearing in the first hologram are compensated by equal and opposite aberrations so that an undistorted reproduction of the object is derived from the second hologram.

The relative aperture must be large enough so that an achromatic core zone which is larger than the rainbow-colored fringes, that is, the rainbow-colored object edges of the hologram or holograms is obtained by the reconstruction of the first hologram and/or the second hologram.

In accordance with a preferred further feature of the invention the rainbow-colored fringe areas of the hologram and/or holograms can be reduced by incorporating an additional diffraction grating or color filter in the system (as is known to those of ordinary skill), to compensate for the dispersion. The use of color filters with merging colors will result in the additional advantage of making it almost impossible to make an unauthorized copy of the hologram. Thus, the resulting holograms are suitable for security purposes.

In accordance with a further preferred feature of the invention the second hologram constitutes a transmission hologram, which can be reconstructed by means of a mirror placed on a rear side of the hologram so that the hologram can be viewed as a reflection hologram.

A special advantage which is afforded by the instant process resides in the fact that a relief image or an embossing can be derived from the interference pattern of the second hologram by known processes, so that the hologram can be mechanically duplicated as often as is desired. The embossing press may be used to either emboss a reflecting surface or an optically transparent material, which may have a specific spectral transmission characteristic and which may be placed in front of a reflective surface.

DETAILED DESCRIPTION OF THE PREFERRED EMBODIMENTS

Single-stage and two-stage processes for recording rainbow holograms will now be described with reference to FIGS. 1 to 3. Such processes are known, e.g., from U.S. Pat. No. 3,633,989.

Figure 1:
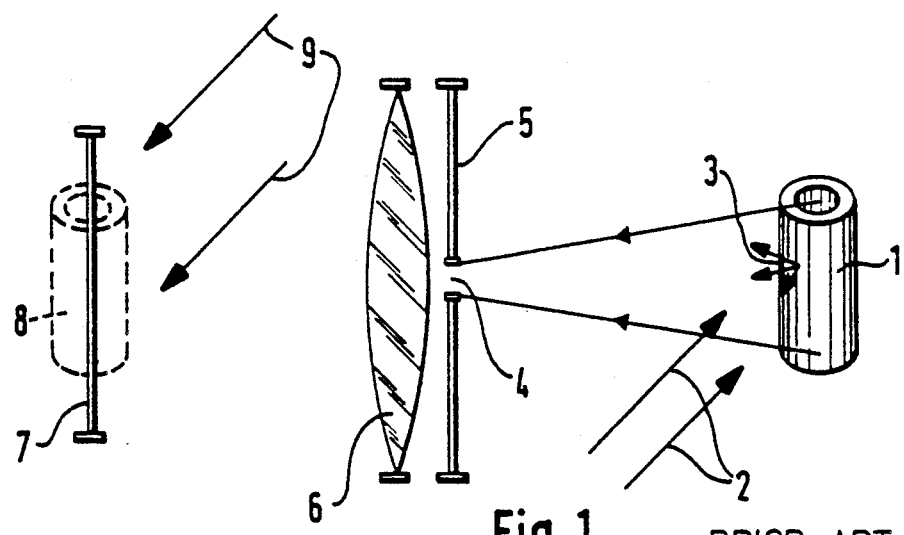
FIG. 1 is a sketch illustrating the known single-stage process of recording a rainbow hologram.

FIG. 1 illustrates the basic setup used to record a hologram with the aid of a slit stop 5. Object rays 2 coming from a laser, not shown, are incident on an object 1.

It is mentioned at this juncture that in all recording processes illustrated in FIGS. 1 to 9 the object must be irradiated with laser light, from which the reference beam is deflected in known manner by mirrors or the like.

The object 1 which is irradiated with the object beam 2 emits the rays 3, which include optical information concerning the object 1 and which pass through the slit 4 of the slit stop 5. An image of the rays is formed in the hologram plane 7 by means of an image-forming optical element, e.g., the positive lens 6. That image is indicated in dotted lines at 8. The image containing information from the object 1 is caused to interfere in the hologram plane 7 with the reference beam 9. The resulting interference pattern is recorded in known manner on photographic recording material in the hologram plane 7.

The process described with reference to FIG. 1 is a single-stage process of making a conventional rainbow hologram. That rainbow hologram is a so-called transmission hologram and can be converted to a surface hologram by copying it on photoresist with blue laser light. In such a surface hologram, the interference structures which carry the hologram information are stored in the form of a surface relief, which can be used for embossing. Such hologram may be provided with a mirror coating so that it can be rendered visible by reflected light. The conversion process will not be explained more in detail because it is known in the art.

A two-stage process of recording a rainbow hologram will now be explained with reference to FIGS. 2 and 3.

Figure 2:
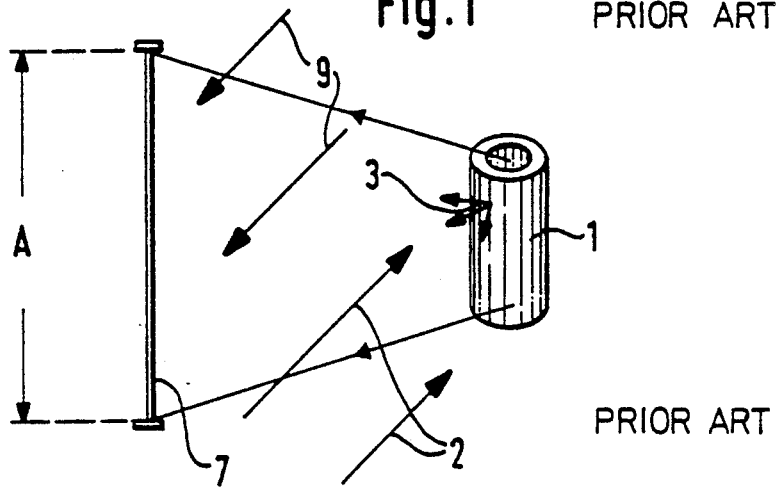
FIGS. 2 and 3 are sketches illustrating a known two-stage process of recording a rainbow hologram.

In the first stage, shown in FIG. 2, the object rays 3 reflected by the object 1 and the reference beam 9 are used to record a transmission hologram in the hologram plane 7 on photographic recording material. That hologram is a master hologram, which cannot be duplicated by embossing.

Figure 3:
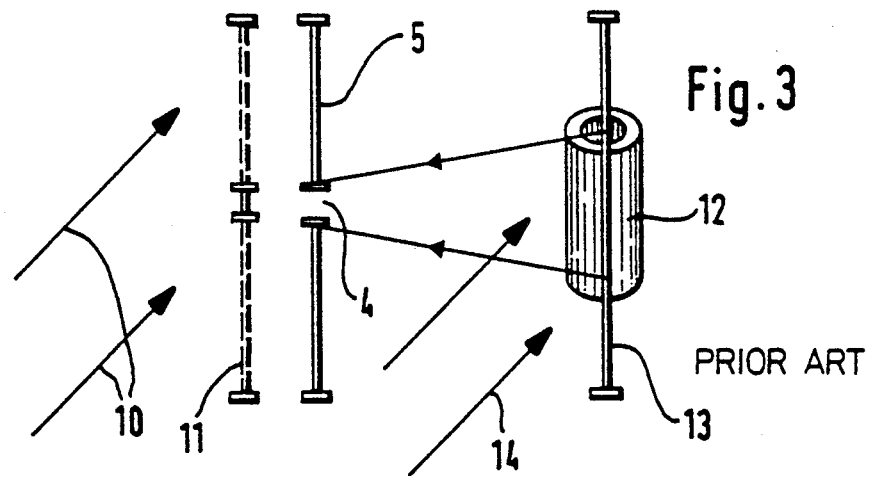

As is shown in FIG. 3, the master hologram 11 is used to reconstruct a hologram image 12 in the second hologram plane 13 with the aid of the reconstructing beam 10, which is passed for reconstruction through the slit 4 of a slit stop 5. The hologram image 12 which has thus been reconstructed is caused to interfere with the reference beam 14. As a result, a second hologram is recorded on a photographic recording material provided in the hologram plane 13.

The hologram which has been recorded in the two-stage process just described is equivalent to the hologram that has been recorded in the hologram plane 7 in FIG. 1.

The processes shown in FIG. 1, on the one hand, and in FIGS. 2 and 3, on the other hand, differ essentially in that no image-forming optical means are used in the two-stage process.

The known slit stop 5 having the slit 4 is used so that the image which is reconstructed with white light appears only in one rainbow color, depending on the angle of view, so that a sharp visible image is obtained. If no slit stop were used during the recording with laser light, the reconstruction of the resulting hologram with white light would represent the recorded picture in all colors of the rainbow and the superimposed colors would not form a sharp image. An image of the slit stop is represented in the recorded hologram. That slit stop will eliminate all images which are formed outside the slit in the colors which appear above and below the image of the slit. As a result, only a virtually monochromic image, which is sufficiently sharp, will appear in a color depending on the angle of view. Rainbow-colored holograms which can be reconstructed with white light can thus be made with the aid of the slit stop 5.

One disadvantage of the rainbow holograms which have been recorded with the aid of the slit stop 5 resides in the fact that they appear in different colors, depending on the angle of view. On the other hand, their solid angle is restricted in a vertical direction so that an autostereoscopic effect is obtained substantially only in the horizontal plane.

Figure 4:
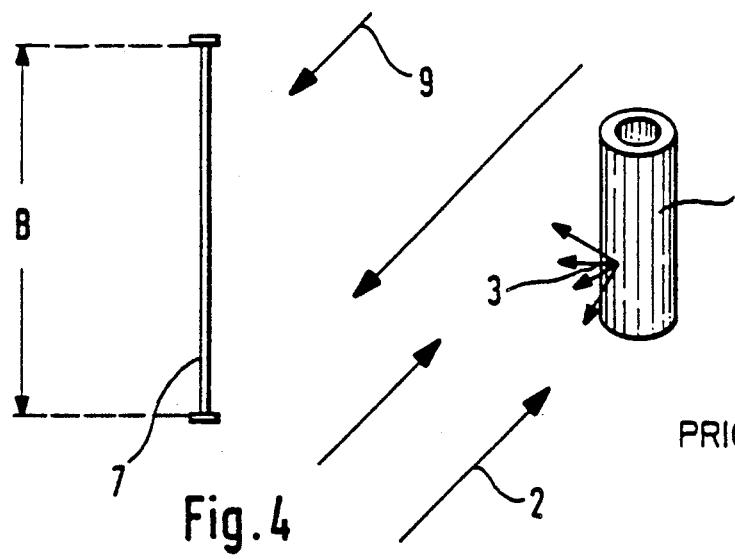
FIGS. 4 to 6 are sketches explaining the known open aperture hologram process.
Figure 5:
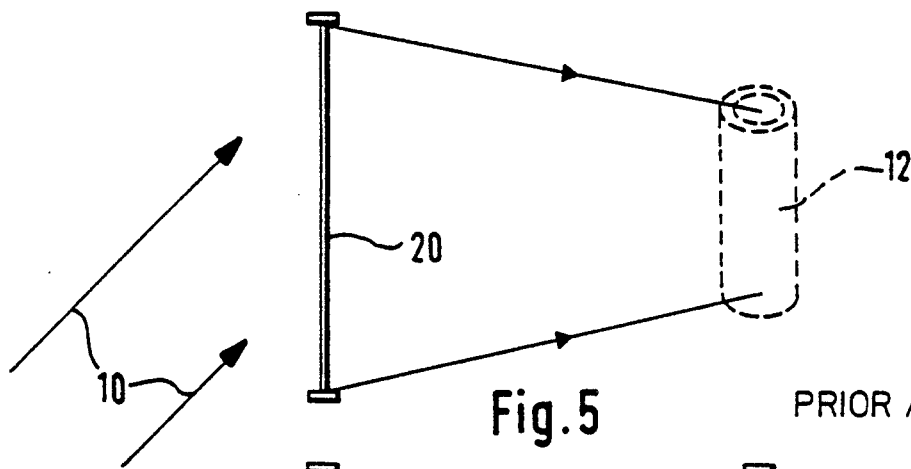
Figure 6:
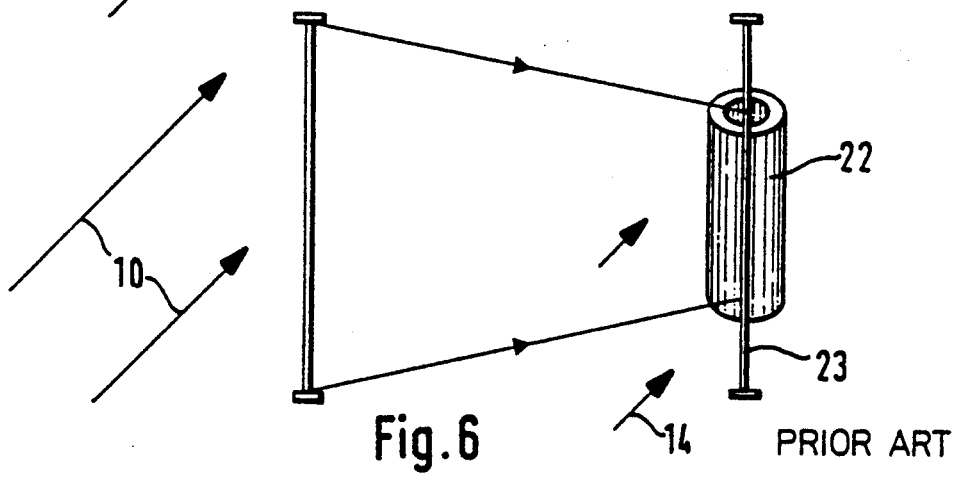

In the process that is illustrated in FIGS. 4 to 6, an achromatic hologram can be made which is three-dimensional in the horizontal plane and in the vertical plane.

For this purpose the reflected object beam 3 and the reference beam 9 consisting of a planar wave are used in the conventional manner to record a hologram in the hologram plane 7, as is apparent from FIG. 4. That hologram is different from the hologram 11 recorded in accordance with FIG. 3 in that the hologram of FIG. 4 is made to have a much larger area because its height is larger, as shown in FIG. 4.

From that master hologram 20, as shown in FIG. 5, a reconstructed hologram image 22 in the second hologram plane 23 is subsequently derived by means of the reconstructing beam 10, which is directed opposite to the reference beam 9, as is illustrated in FIG. 6. The second hologram can then be recorded by means of the reference beam 14 on photographic recording material arranged in the hologram plane 23.

Figure 11A:
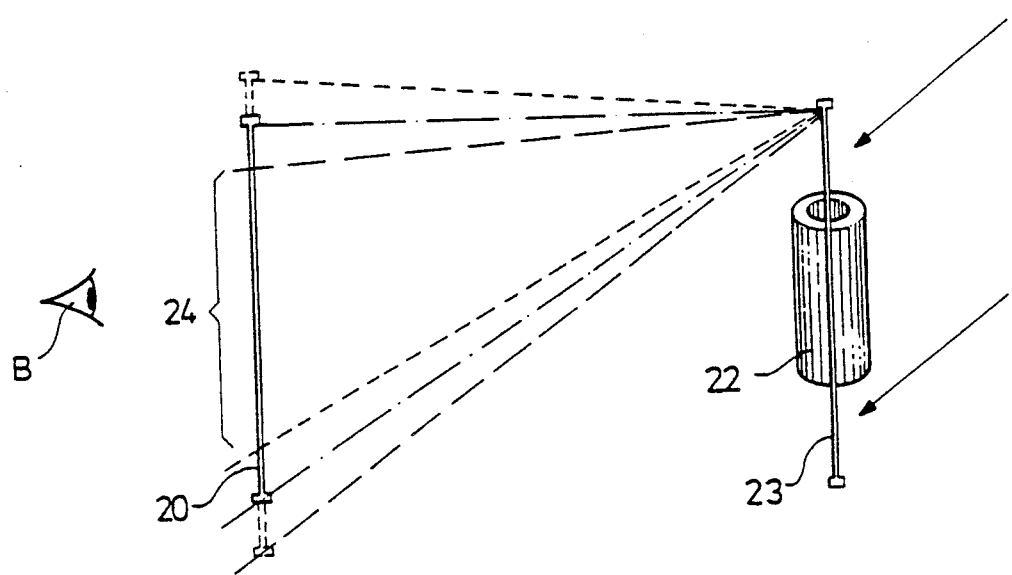
FIGS. 11a and 11b are sketches illustrating how an achromatic hologram made in accordance with the invention is reconstructed with white light in the presence of an image-forming element (FIG. 11b) and in accordance with a known process (Fig. 11a) in the absence of an image-forming element.
Figure 11B:
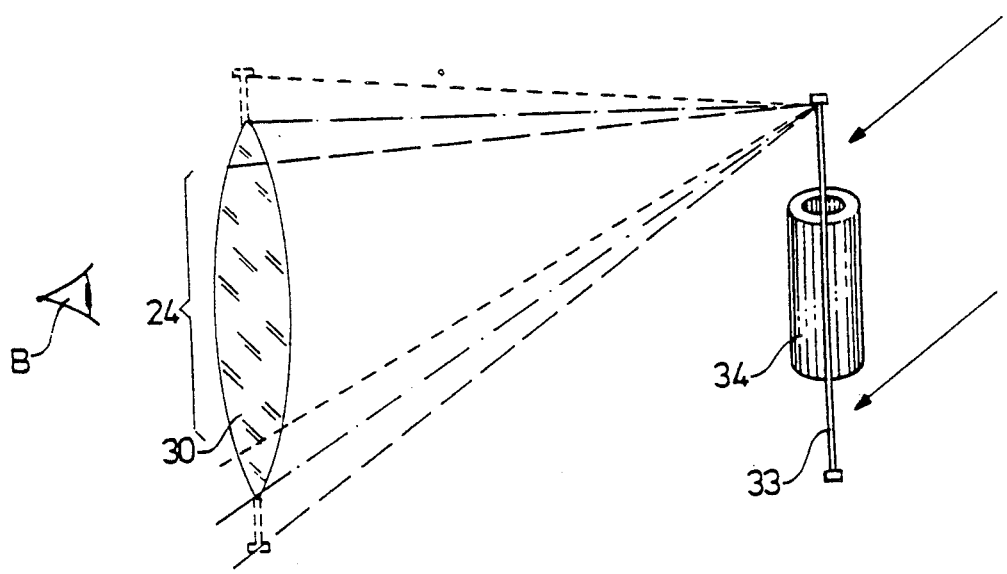
Figure 12:
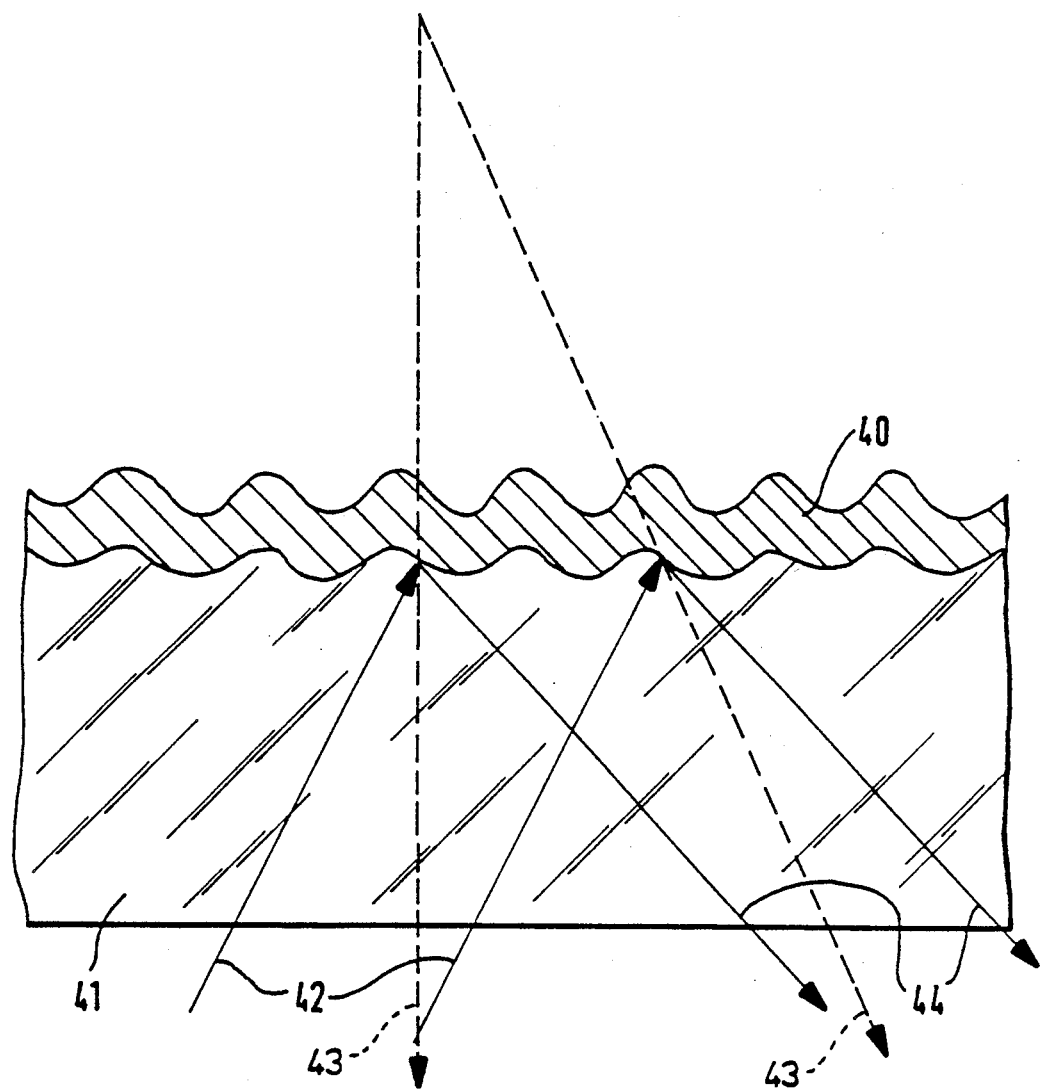
FIG. 12 is an enlarged sectional view showing an embossed hologram made by the process in accordance with the invention.

As is shown in FIGS. 11a and 11b, that hologram 22 can then be reconstructed by means of white light to form an achromatic holographic image which is three-dimensional in all directions. This is possible because the master hologram 20 is so large that the rainbow-colored, offset, superimposed images are formed only at the periphery of the image as represented by the broken and dashed lines and the core zone 24, which is sufficiently large owing to the size of the master hologram, represents a visible three-dimensional achromatic holographic image. As is apparent from FIGS. 1a and 11b, each point of the second hologram 20 directs light of all wave lengths to the hole of the exit pupil which corresponds to the aperture of lens 30 (see FIG. 9) and the second hologram 20 is recorded in all of the rainbow colors. But because the hologram 20 has a large area, all rainbow colors of the bright points of the reconstructed image when observed through core zone 24 are in register so that an achromatic image is observed through the core zone 24 in the plane of the reconstructed aperture image. When the hologram image which is reconstructed in the hologram plane is then viewed through that reconstructed aperture plane, the reconstructed hologram will appear in black and white to the viewer B.

The known process which has been described last is very difficult and expensive because it is difficult to record holograms of large area with collimated light from a laser. For adequate illumination, a relatively high luminous intensity is required if the exposure time is relatively short. Owing to the large area it is also highly expensive to control the planar wave fronts.

These difficulties are avoided by the process of the instant invention, which will now be explained more in detail with reference to an illustrative embodiment shown in FIGS. 7 to 12.

Figure 7:
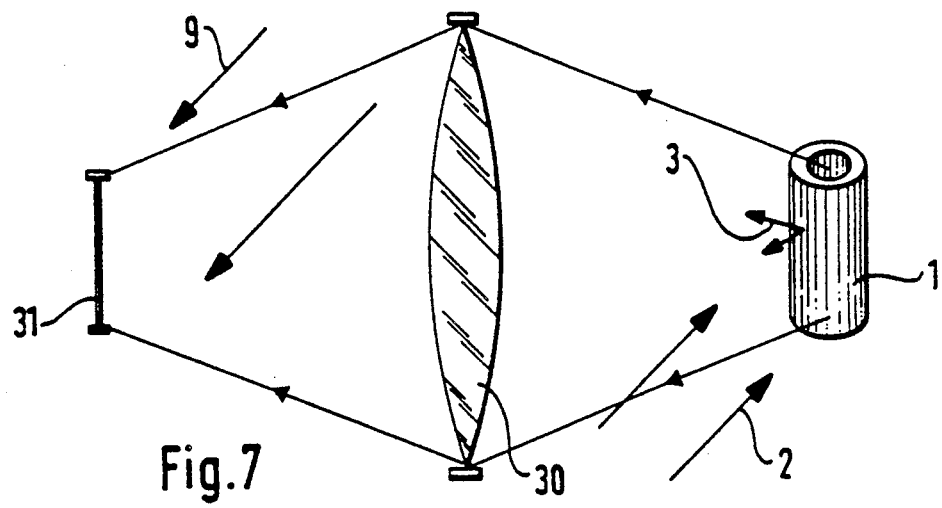
FIGS. 7 to 9 are sketches illustrating the process in accordance with the invention, wherein a small master hologram is made and an image-forming element having a large relative aperture is employed.

In accordance with FIG. 7, the reflected object beam 3 is focused on the hologram plane 31 by the image-forming optical element 30, as illustrated, so that a master hologram 32 (FIG. 8) can be recorded in hologram plane 31 on photographic recording material by means of the reference beam 9. In the manner illustrated in FIG. 8, the reconstructing light beam 10 is used to derive from the master hologram 32 by means of the image-forming optical element 30, a reconstructed image 34 of the object in the second hologram plane 33 (FIG. 9). That reconstructed object image 34 is then recorded in the second hologram plane 33 (FIG. 9) by means of the reference beam 14 to form the second hologram.

Because of the light for recording the second hologram passes through the image-forming optical element 30 in the reverse direction, the aberrations produced by the optical element 30 on the master hologram 32 will be compensated for in the reconstructed second hologram so that the latter represents an undistorted image of the original object.

Another reason why the second hologram contains fewer abberations resides in the fact that the master hologram is smaller so that it can be recorded with a smaller collimated beam.

The hologram made by the process in accordance with the invention is an achromatic hologram, as will now be explained with reference to FIGS. 11a and 11b.

In the open aperture process the achromatic hologram is derived from the large master hologram 20 FIG. 11a). In the process in accordance with the invention, the large aperture which is required is provided only by the image-forming optical element 30 (FIG. 11b) but there is no need to make a large master hologram. For this reason, the hologram technology may be restricted to the known processes and a large aperture is provided so that the light is reversely transmitted through the image-forming optical element 30. The image-forming optical element may consist of inexpensive lenses because their aberrations are compensated by the reverse transmission of light.

Figure 8:
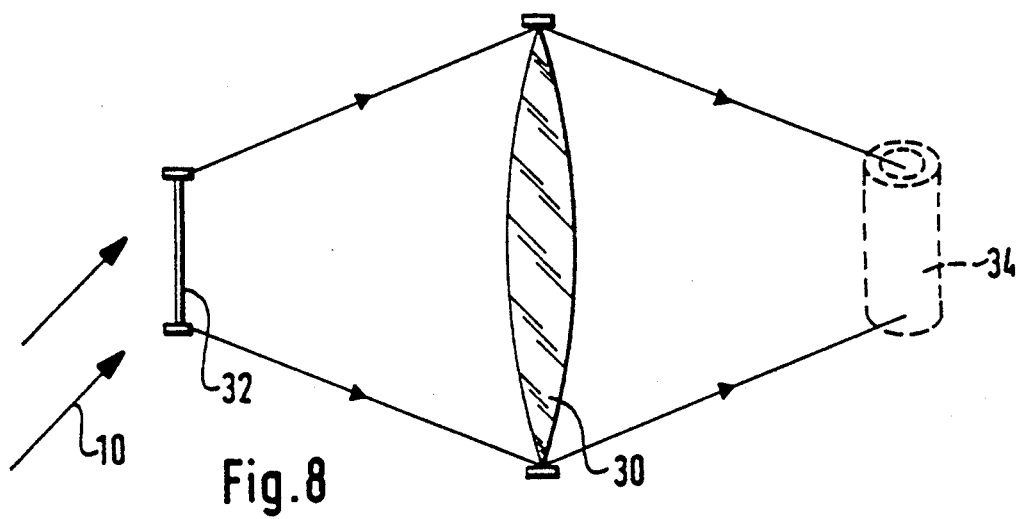
Figure 9:
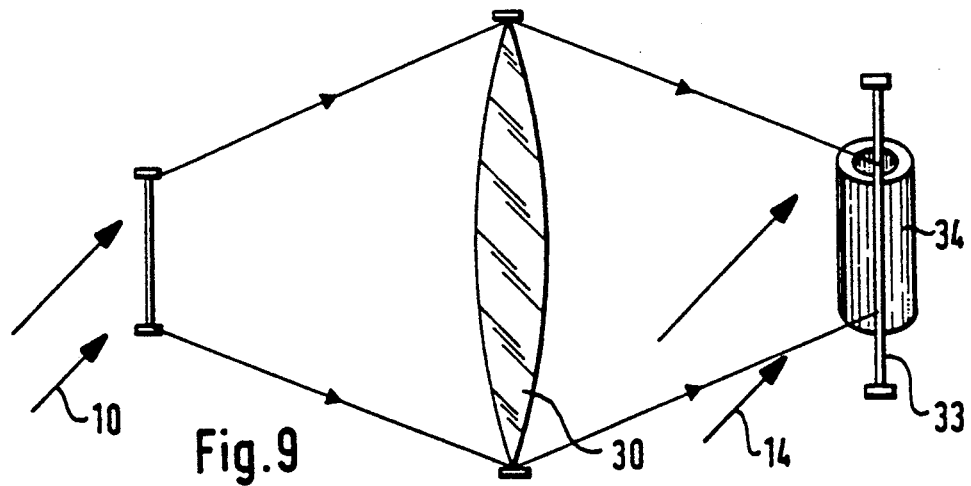
Figure 10:
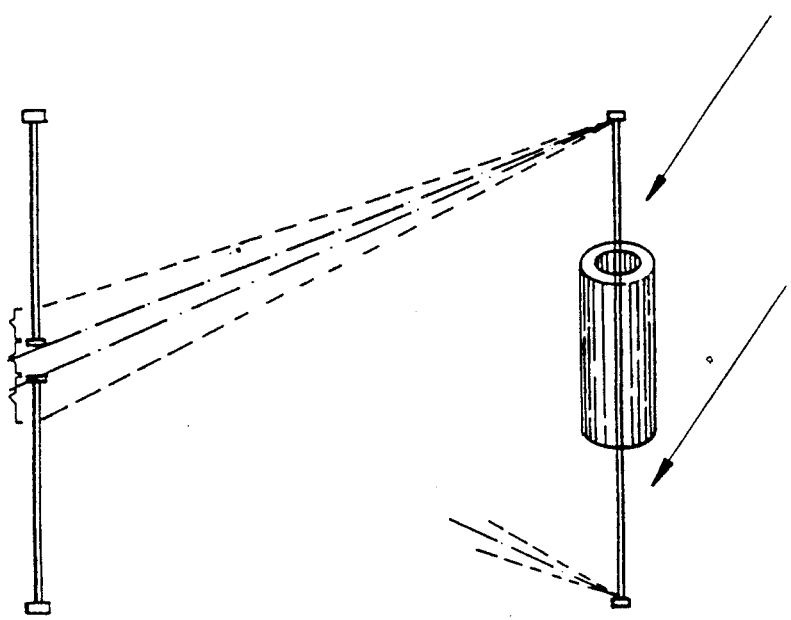
FIG. 10 is a sketch illustrating the known process for reconstruction of rainbow holograms.

The hologram made in hologram plane 33 by the process in accordance with the invention, as shown in FIGS. 7 to 9, is initially a transmission hologram. That transmission hologram can be transformed by known processes to a surface hologram, which can be duplicated by embossing. An embossed hologram which has been made by means of an embossing press and which corresponds to a primary hologram made by the process in accordance with the invention is illustrated from FIG. 12. That embossed hologram comprises a reflecting layer 40, such as aluminum, which has been applied to an optically transparent substrate 41. The reconstructing beam 42 is transmitted through the transparent layer 41 to fall on the reflecting layer, which owing to the embossed relief effects a phase modulation so that that reflecting layer diffracts a part 44 of the incident light into the zero order. Owing to phase displacements caused by the relief, another part is diffracted into the first order as shown in the rays 43. The rays 43 will then show a reconstruction of the recorded image of the object. The optically transparent layer may consist, e.g., of polyvinylchloride or polyester.

The transparent material may be dyed in a desired color. Dyeing may be used to restrict the bandwidth so that sharper images will be obtained.

It is also possible to emboss the transparent material 41 and omit the reflecting layer so that a phase transmission hologram is obtained.

Dyeing will provide an additional security feature if the embossed hologram is to be used for an indication of authenticity. In that case copying by unauthorized persons is prevented substantially completely.

Holograms consisting of microscopic surface structures may be copied by direct casting or molding processes or by optical methods.

An unauthorized mechanical copying of the relief can be prevented since the structures provided with the relief are embedded in a molding or casting so that the relief will be inaccessible. If a relief is covered with a transparent layer which has been dyed in a selected color, such relief can be copied with laser light only by means of a dyestuff laser having a variable wavelength. But even a dyestuff laser cannot be used to make a complete copy if the transparent layer exhibits merging colors.

What is claimed is:

1. A process for making an achromatic hologram which is adapted to be reconstructed with white light and which is recorded on photographic record carrier by means of an object beam and a reference beam of coherent monochromatic light in an operation in which the object beam passes through an image-forming optical element disposed between an object and the recording material of said photographic record carrier comprising:

(1) disposing said image-forming optical element having a relatively large aperture between said object and said recording material and recording a first hologram on said record carrier by passing said object beam and said reference beam through said aperture and through said recording material from one side thereof;

(2) developing said first hologram;

(3) re-inserting said first hologram in the same location;

(4) then projecting a beam which in conjugate to said reference beam through the first recorded hologram so as to reconstruct the object wave from said first hologram, said object wave being projected back through said image-forming optical element and forming an image of said object at the original position of said object; and (5) making a second hologram at that location by interfering said image with a reference beam identical to that used to form said first hologram so as to record an undistorted image of the object in said second hologram on a second record carrier, said relatively large aperture being at least large enough so that an achromatic core zone for viewing the reconstructed image is obtained.

2. A process according to claim 1 including placing a mirror on the rear side of the first hologram and reconstructing the second hologram as a transmission hologram.

3. A process according to claim 1, including forming an embossing with a relief derived from the interference pattern of the second hologram.

4. A process according to claim 3, including employing the embossing to emboss a reflecting surface.

5. A process according to claim 3, including employing embossing to emboss a transparent material which has a variegated spectral transmission characteristic and which consists of transparent plastic material containing dyestuffs.

6. A process according to claim 5, comprising employing transparent material which has a specific spectral transmission characteristic which produces color effects by polarization or gratings.

7. A process according to claim 4, including covering the embossing on at least one side with a transparent color filter of variegated colors and producing predetermined color filter effects.

8. A process according to claim 5, wherein the variegated colors merge.

* * * * *